(12) United States Patent
Appa (10) Patent No.: US 6,375,127 B1
(45) Date of Patent: Apr. 23, 2002

(54) ACTIVE CONTROL SURFACE MODAL SYSTEM FOR AIRCRAFT BUFFET AND GUST LOAD ALLEVIATION AND FLUTTER SUPPRESSION

(76) Inventor: Kari Appa, 22242 Anthony Dr., Lake Forest, CA (US) 92630-2327

( * ) Notice: Subject to any disclaimer, the term of this patent is extended or adjusted under 35 U.S.C. 154(b) by 0 days.

(21) Appl. No.: 09/612,058

(22) Filed: Jul. 7, 2000

(51) Int. Cl.$^7$ .................................................. B64C 9/18
(52) U.S. Cl. ........................ 244/215; 244/203; 244/219
(58) Field of Search ............................... 244/35 R, 203, 244/219, 201, 211, 212

(56) References Cited

U.S. PATENT DOCUMENTS

| | | | |
|---|---|---|---|
| 1,823,069 A | * | 9/1931 | Stroop |
| 1,856,578 A | * | 5/1932 | Miquel et al. |
| 2,167,601 A | * | 7/1939 | Rose |
| 3,734,432 A | | 5/1973 | Low ......................... 244/77 G |
| 4,706,902 A | | 11/1987 | Destuynder et al. ...... 244/76 C |
| 5,375,794 A | | 12/1994 | Bleeg ........................ 244/76 C |
| 5,549,260 A | | 8/1996 | Reed, III ..................... 244/195 |
| 5,839,698 A | * | 11/1998 | Moppert |
| 5,887,828 A | | 3/1999 | Appa ........................... 244/215 |
| 6,070,834 A | * | 6/2000 | Janker et al. |

* cited by examiner

Primary Examiner—Charles T. Jordan
Assistant Examiner—T. Dinh
(74) Attorney, Agent, or Firm—Albert W. Hilburger (57) ABSTRACT

The present invention relates to an Active Control Surface Modal (ACSM) device that generates unsteady aerodynamic damping to alleviate aeroelastic structural instability, vibration and dynamic loads. An active control surface modal deformation is created by means of a pair of antagonistically activated actuators. Since the masses of upper and lower surface skins are lighter, the modal deformations can be activated at high frequencies that can encompass wide band spectrum of buffet, gust and flutter problem areas. An independent closed loop active control system is used to activate the ACSM modes. Measured acceleration sensors are used as the feedback signals to compute the coefficients of the control law that is designed to suppress the dynamic environments such as buffet, gust and flutter. Then a computerized control system algorithm outputs a series of voltage signals that pass through power amplifiers to activate the actuators. Then the ACSM device generates unsteady aerodynamic damping in out-of-phase with the external (buffet/gust) or self excited air loads (flutter) to reduce or eliminate the undesirable dynamic effects on the aircraft. Some buffet analyses of a vertical tail, typical of a fighter aircraft, show 80 per cent reduction in peak stress, which amounts to an eight fold fatigue life extension of the vertical tail.

17 Claims, 7 Drawing Sheets

ACTIVE CONTROL SURFACE MODAL SYSTEM FOR AIRCRAFT BUFFET AND GUST LOAD ALLEVIATION AND FLUTTER SUPPRESSION

The U.S. Government has a paid-up license in this invention and the right in limited circumstances to require the patent owner to license others on reasonable terms as provided by the terms of Contract No. F33615-99-C-3214 awarded by the United States Air Force.

BACKGROUND OF THE INVENTION

1. Field of the Invention

The present invention relates generally to a dynamic load alleviation system and, more particularly, to the design, manufacture, and operation of an active control surface modal device.

2. Description of the Prior Art

Civil and military aircraft encounter a number of dynamic load conditions resulting from fluctuating air loads. Such environments lead to ride discomfort, structural fatigue damage and degradation of flight performance. Hence, there is a need to improve the fatigue life and flight performance of civil and military aircraft.

Figure 1:
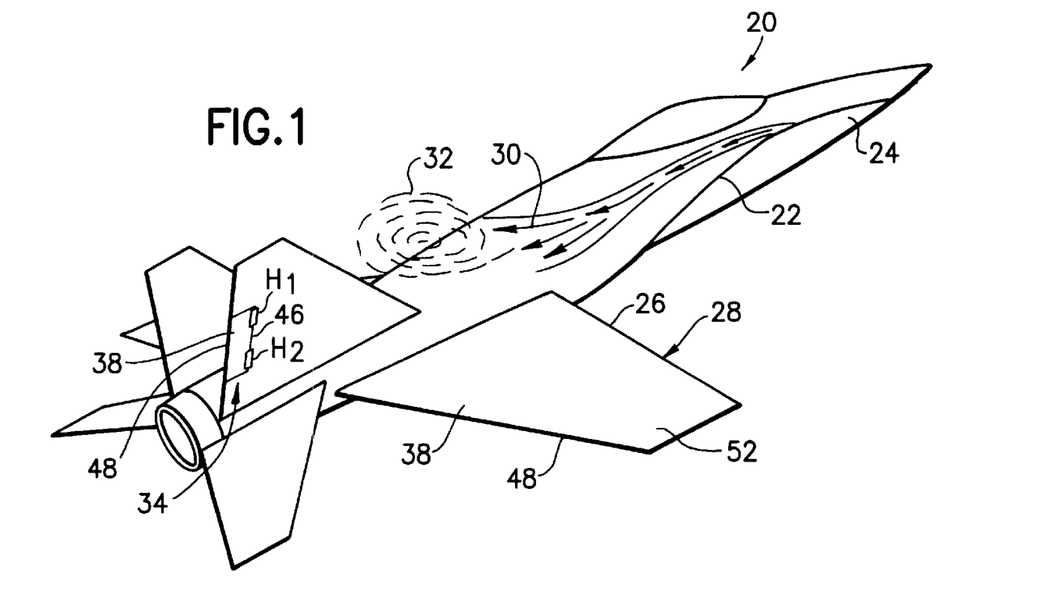
FIG. 1 is a perspective view of a typical high performance aircraft subjected to the type of dynamic load conditions which the present invention is intended to alleviate.

Buffet is a turbulence phenomenon that originates from flow separated wake created behind any aerodynamic lifting surfaces or bodies. In a typical example illustrated in FIG. 1, a modern high performance aircraft 20 incorporates a strake 22 on a fuselage 24 extending into a leading edge 26 of a wing 28. In a typical fashion, the release of strong vortices 30 behind the leading edge extension, or strake, of the aircraft are depicted. At some distance from its origin, as depicted at 32, the vortex core bursts and engulfs the tail 34. In this manner, micro vortices are generated which cause a fluctuating pressure field of random nature and severely excite the tail of the aircraft.

Such dynamic environments have caused fatigue failures at the root and the mid-section of the vertical tail or tails of aircraft on which they appear. Tail skin fasteners around the rudder hinge line often disappear. Buffet induced excitation can also lead to dynamic problems of engine mounts that are dose to the tail root section. Consequently, these problems increase the life cycle cost of an aircraft. As a result, the Government procuring agencies and aircraft manufacturers are interested in finding solutions to these problems.

Buffet load problems have been extensively studied by a number of its investigators. These studies were actually conducted in two parts. The first part of these studies was devoted to the understanding of the physical characteristics of the fluctuating pressures, while the second part was focused on the remedial procedures. The remedial procedures offer passive and active control methods. A brief account of these studies will now be discussed.

Passive Buffet Load Control Methods

The passive methods include the design of various configurations of the leading edge extension (LEX) with and without fences on the LEX. The fences serve to break up the vortex core and consequently reduce the vortex strength. On the other hand, strong vortex cores are required to generate suction pressure to achieve super maneuver performance of high performance aircraft. Although fences reduce the root bending moment on the vertical tail, these were not recommended for the production series aircraft for two reasons: (1) they are expensive to install, and (2) they degrade the quality of flow intended for high angle of attack maneuvers. One study reports an alternate passive method that uses blowing and suction of air around LEX to suppress buffeting.

Active Buffet Load Control Methods

Two different principles are used in active buffet load control technology.

Principle No. 1, so-called, uses aerodynamic effectors (control surfaces or active control surface modes generally of the presented below in this disclosure) to generate aerodynamic damping that reduces buffet induced oscillations. The deployment of these effectors is achieved by means of actuators, either of conventional hydraulic actuators having low frequency bandwidth or smart actuators having broad band frequency range. The power requirement is directly related to the amount of damping required, or in other words, deployment amplitude of the effectors. This is a positively robust approach.

Principle No. 2, so-called, uses an anti-wave generation method in which the structure is excited at its natural frequencies and out-of-phase with the forcing signals. In this approach, cancellation can be achieved only at discrete frequencies of the structural modes. At other frequencies, enormous power is required to excite the structure to generate aerodynamic damping. Since buffet is a broad band phenomenon, it can force all structural modes at the same time. The wave cancellation method can be effective only at one frequency at a time, which is the principle behind surface mounted piezoactuators.

One investigator and his associates employ the first principle to reduce buffet induced structural stresses. They activate the rudder using conventional hydraulic or pneumatic actuators to generate out-of-phase unsteady aerodynamic loads to suppress vibration of the tail. Unfortunately, there are two main problems in this approach. The first problem is that the flight control system and the buffet control system use the same control surface, which reduces the availability of the control surface for either purpose. Also, interference with the flight control is an undesirable aspect that pilots do not like. In addition, the conventional actuators are limited in the frequency bandwidth which makes it difficult to swing the massive rudder at higher frequencies about the hinge line. For example, the rudder of an F/A-18 weighs about 64 pounds. Hence, the ability of such a typical airfoil and its actuators to function in a wide-band buffet spectrum is significantly limited. One wind tunnel study sponsored by NASA, reported a 60% reduction of bending moment in a buffet load environment. This particular wind tunnel study employed a ⅙-scale F-18 model with actively controlled surface mounted piezoelectric actuators on the vertical fins. The disadvantage of this approach will be discussed shortly.

While surface mounted piezoelectric actuators proposed for some of these programs are good candidates for wind tunnel models they have no practical value for production scale aircraft for the following reasons:

- surface mounted piezoelectric actuators cannot produce anti-mode waves to counteract the buffet excitation and cannot provide large surface strains;
- the model studies assumed that actively controlled piezoelectric actuators provide necessary mechanical damping to suppress vibration. This assumption does not hold well for full-scale aircraft. In reality, aerodynamic damping plays a greater role than the mechanical damping. The merits of aerodynamic damping have been demonstrated in active flutter suppression technologies.

surface mounted actuators and electrical contacts may fail due to fatigue and erosion;

surface mounted actuators cause flow separation;

there is a weight penalty if the surface mounted actuators are used in large quantities; and high voltage input may be required which would cause the risk of arcing across structural joints.

Gust environment is another important aspect of aircraft dynamic loads that arise from atmospheric turbulence. Here, aircraft penetrate a sinusoidal gust wave resulting in loss or gain of vertical lift force. Thus, in this instance, the aircraft is subjected to external excitations causing ride discomfort and structural fatigue damage.

Still another design criterion that requires a careful consideration is flutter, or aeroelastic instability. Flutter is a self-excited oscillatory phenomenon that results in structural instability leading to catastrophic destruction when the flight speed exceeds the design speed limit.

A small number of patents are typical of the known prior art attempting to reduce dynamical loads. For example, U.S. Pat. No. 4,706,902 to Destuynder et al. discloses an active control method of reducing the buffet loads. A device is used to detect buffet onset and active control system is used to actuate a number of control surfaces about their hinge lines to generate aerodynamic damping forces to oppose buffet excitation. Since buffeting is a broad band excitation phenomenon containing a high frequency spectrum in the range of 100 to 300 Hz (cycles per second), the control surface cannot be set in high frequency motion. Consequently, its utility is necessarily limited to low frequency modes of vibration. U.S. Pat. No. 5,549,260 to Reed, III discloses an active control device and method for aircraft tail buffet alleviation. The device employs a rotatable slotted cylinder (RSC) partially embedded in the spanwise direction within the contour of the tail surface. Tail tip accelerations were used as the input signals to activate the RSC device to oscillate about +/−15 degrees at required frequencies. In the open position, the upper surface air stream is allowed to pass through the RSC device and exit at the lower surface. Thus, the diversion of airflow must take place at high frequencies for the system to be effective. However, flow continuity can only exist at low frequencies, while at high frequencies the flow separates and the RSC device becomes ineffective. Moreover, the installation of the RSC device weakens the primary structure.

U.S. Pat. No. 5,375,794 to Bleeg discloses an apparatus and method for reducing aircraft loads resulting from atmospheric turbulence and gusts. The primary objective of this disclosure is to improve ride quality and reduce unwanted side loads by commanding a canceling rudder position. However, this device does not attempt to alleviate dynamic loads that result from buffeting.

U.S. Pat. No. 3,734,432 to Low discloses a flutter suppression device. This invention uses a number of pairs of leading and trailing edge control surface pairs in conjunction with a flight control system to suppress the on-set of flutter instability. The major drawback of this approach is that the control surfaces are used by the flight control system to maintain the stability of the aircraft. But, the flutter suppression device commands the same control surfaces. The dual-purpose control algorithms are often undesirable and pilots discourage such devices from safety consideration viewpoint. Besides, if flutter instability of n vibration modes is to be suppressed, this approach requires n/2 pairs of leading and trailing edge control surfaces. These are too many for a flight control system to be reliable and economical.

It was with the knowledge of the foregoing state of the technology that the present invention has been conceived and is now reduced to practice. An active control surface modal (ACSM) device for aircraft buffet and gust load alleviation, and flutter suppression, embodied by this invention is different from all of the devices reviewed above. Furthermore, this system can easily be implemented in existing as well as in new aircraft without significant alterations in the design.

SUMMARY OF THE INVENTION

The present invention, then, relates to an Active Control Surface Modal (ACSM) device that generates unsteady aerodynamic damping to alleviate aeroelastic structural instability, vibration and dynamic loads. An active control surface modal deformation is created by means of a pair of antagonistically activated actuators. Since the masses of upper and lower surface skins are lighter, the modal deformations can be activated at high frequencies that can encompass wide band spectrum of buffet, gust and flutter problem areas. An independent closed loop active control system is used to activate the ACSM modes. Measured acceleration sensors are used as the feedback signals to compute the coefficients of the control law that is designed to suppress the dynamic environments such as buffet, gust and flutter. Then a computerized control system algorithm outputs a series of voltage signals that pass through power amplifiers to activate the actuators. Then the ACSM device generates unsteady aerodynamic damping in out-of-phase with the external (buffet/gust) or self excited air loads (flutter) to reduce or eliminate the undesirable dynamic effects on the aircraft. Some buffet analyses of a vertical tail, typical of a fighter aircraft, show 80 per cent reduction in peak stress, which amounts to an eight fold fatigue life extension of the vertical tail. This improvement could save millions of dollars per aircraft in its service life.

A primary feature, then, of the present invention is the provision of a dynamic load alleviation system which successfully suppresses flutter, buffet, and gust loads to which the airfoil is subjected.

Another feature of the present invention is the design, manufacture, and operation of an active control surface modal device embodying the invention.

Still another feature of the present invention is the provision of such a system which provides overwhelming aerodynamic damping in a wideband frequency spectrum so that buffet, gust and flutter associated dynamic problems can be attended to by means a single device.

Yet another feature of the present invention is the provision of such a system provided with an independent active control algorithm so that there is no interference with the flight control system.

Still a further feature of the present invention is the provision of such a system in which the modified control surface preserves all the entities of a conventional control, being able to rotate about the normal hinge line.

Yet a further feature of the present invention is the provision of such a system which can be economically retrofitted to existing aircraft and even more economically be implemented into new aircraft.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 2:
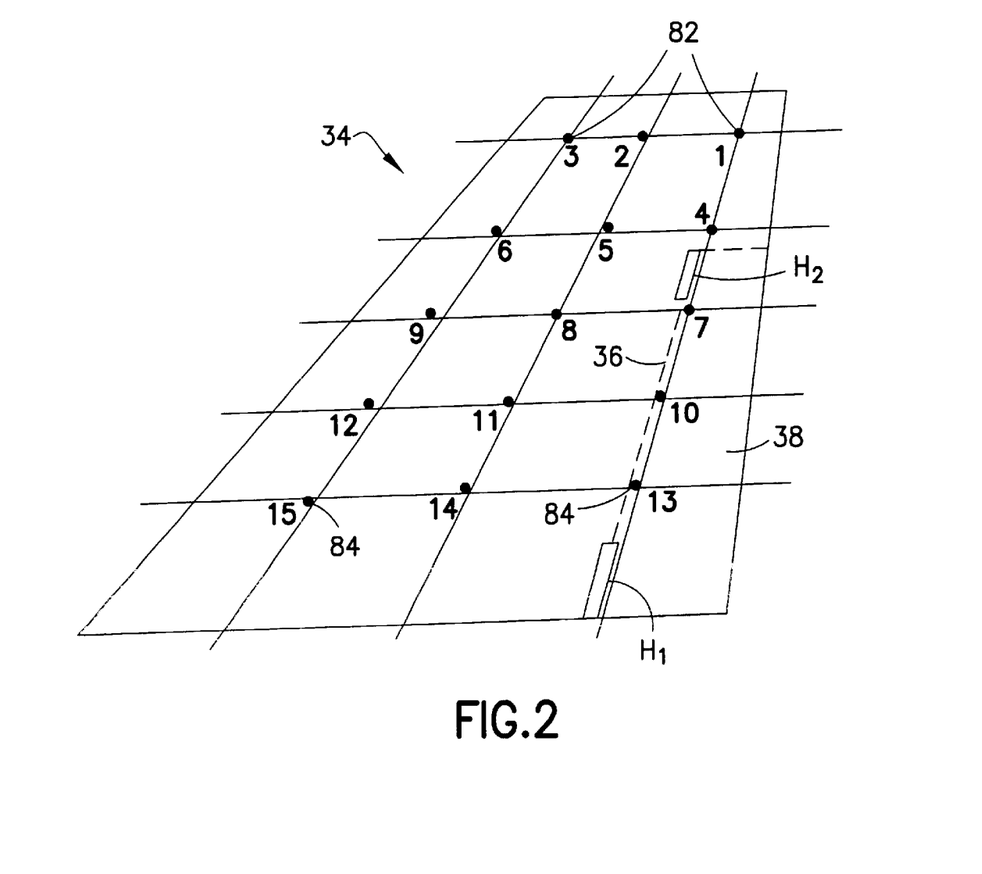
FIG. 2 is a side elevation view of a vertical tail of the aircraft embodying the present invention illustrated in FIG. 1.

Referring now to FIG. 2, there is shown a side elevation view of the tail 34 of the aircraft 20 (FIG. 1) incorporating features of the present invention. Although the present invention will be described with reference to the embodiment shown in the drawings, it should be understood that the present invention can be embodied in many alternate forms or embodiments. In addition, any suitable size, shape or type of elements or materials could be used.

Besides strength considerations, dynamic effects such as buffet, gust and flutter are important design aspects that ensure long service life and structural integrity. Service life depends very much on the fatigue characteristics of a structure, which in turn relates to peak stresses in the dynamic environment. Buffet and gust load environments are the crucial factors in the aircraft design. Flutter, a self excited aeroelastic phenomena that involves structural stiffness, mass and unsteady air loads, is also an equally important design criteria. The present invention provides a unified approach using a single device to reduce dynamic stresses arising from buffet and gust loads, and to eliminate flutter within the flight envelope of the aircraft. A detailed description of the approach is presented next.

Figure 3:
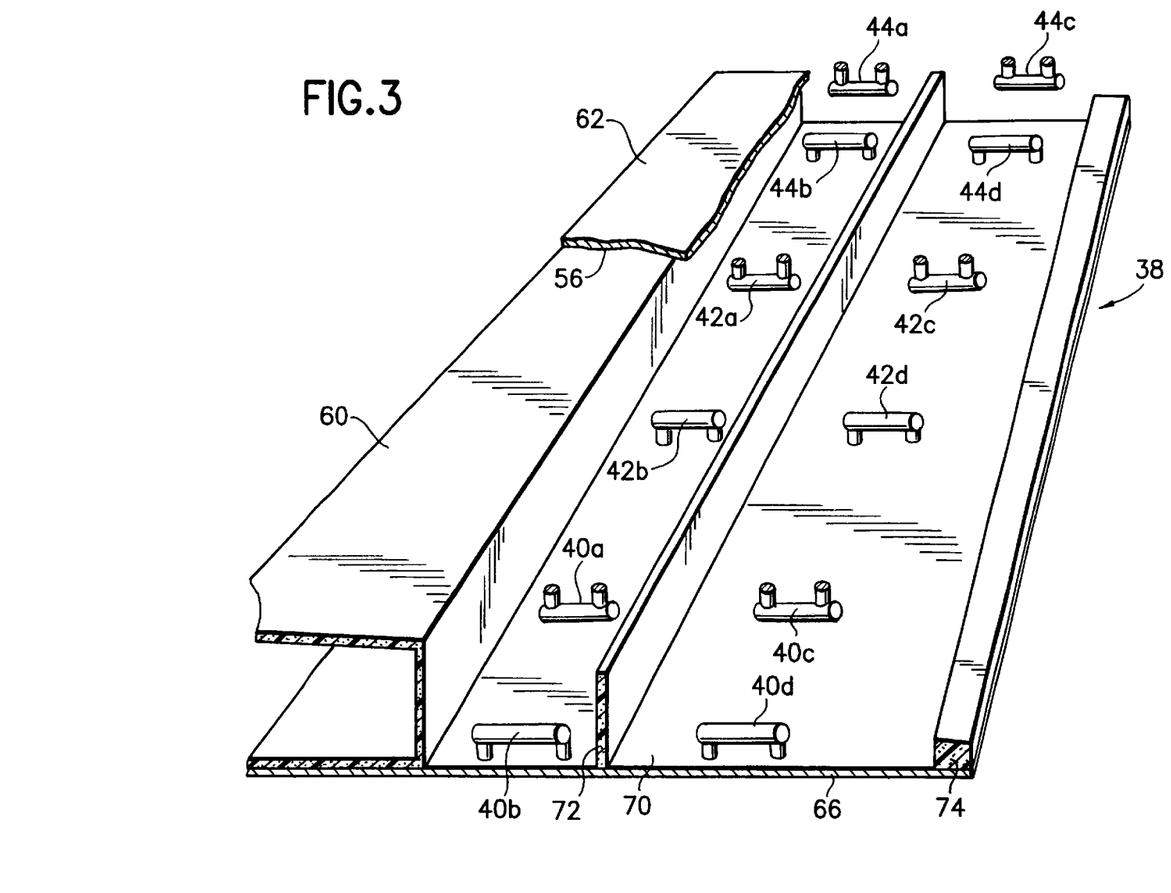
FIG. 3 is a diagrammatic perspective view partially broken away and shown in section to illustrate the interior of a rudder on the vertical tail illustrated in FIGS. 1 and 2.

FIG. 2 diagrammatically represents the vertical tail 34 as a typical aerodynamic lifting surface. For purposes of the invention, a lifting surface may be defined as a surface which generates aerodynamic loads normal to its surface regardless of orientation. Therefore, a vertical, or generally upright, component such as a vertical stabilizer on which a rudder is mounted may be considered an aerodynamic lifting surface. A dashed boundary 36 here denotes a control surface 38 that will be used as the actively commanding aerodynamic effector. This control surface 38 is actuated by a number of light weight and high frequency smart actuators 40a–40d, 42a–42d, 44a–44d (FIGS. 3, 4, and 5) typically of the piezoelectric or magnetorestrictive type. This device is generally a modified version of the prior art as exemplified by U. S. Pat. No. 5,887,828 issued to Appa. The piezoelectric actuators produce forces in response to voltage input, while the magnetorestrictive actuators use current as the input.

Figures 4, 5, 6, 7:
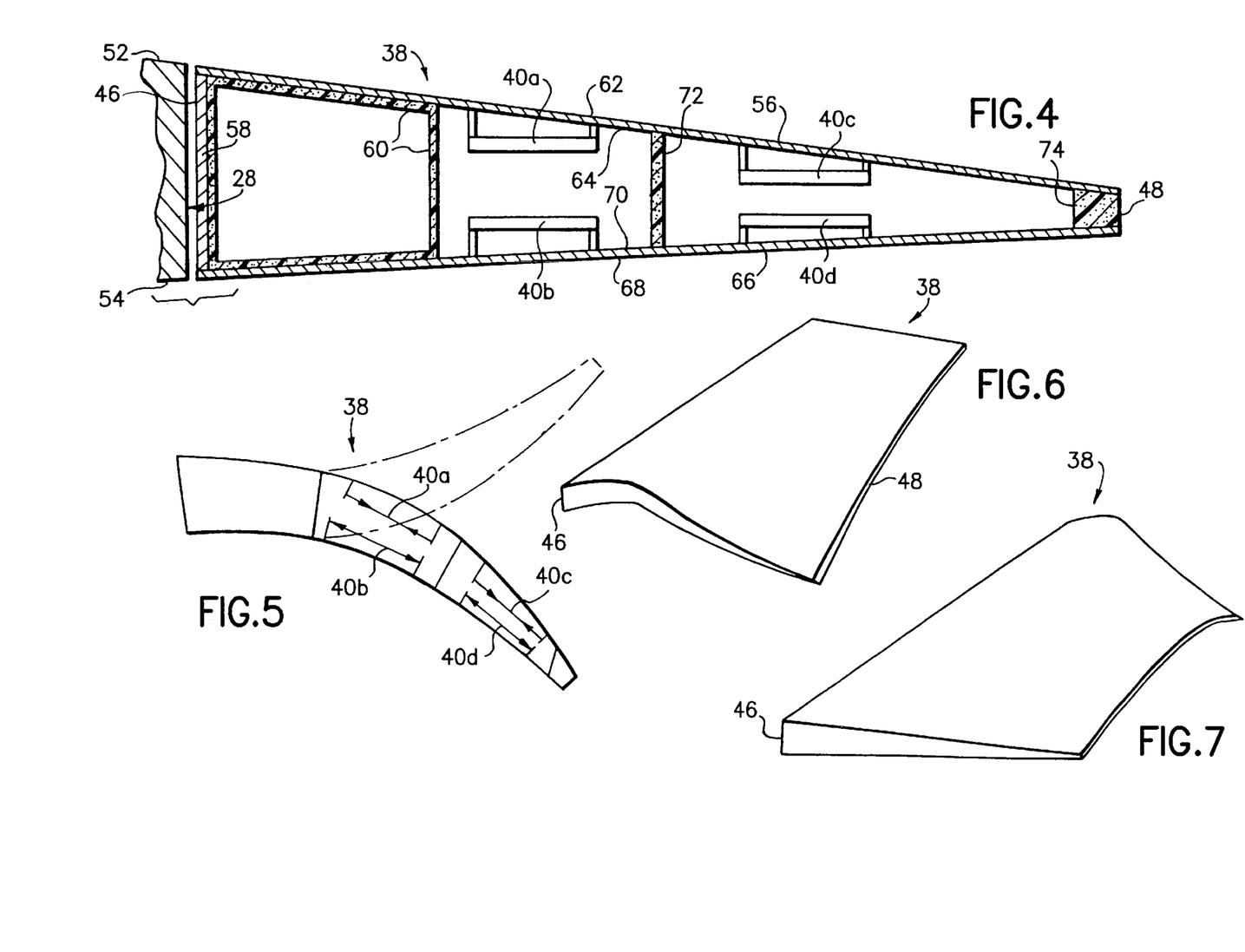
FIG. 4 is a perspective view, certain parts being cut away and shown in section, to illustrate the interior of the control surface on the airfoil of FIG. 2.
FIG. 5 is a diagrammatic cross section view, similar to FIG. 4 but illustrating with solid lines one extreme position which the control surface can assume and with dashed lines another extreme position which the control surface can assume.
FIG. 6 is a perspective view illustrating one mode of operation of the control surface and its resulting contour.
FIG. 7 is a perspective view illustrating another mode of operation of the control surface and its resulting contour.

As seen especially well in FIG. 4, the control surface 38 has a leading edge 46 and a trailing edge 48 and is rotatably mounted as by suitable hinges $H_1$ and $H_2$ at its leading edge on a spanwise extending spar of an aerodynamic lifting surface, specifically, the vertical tail 34. In customary fashion, the tail 34 includes an upper surface 52 and a lower surface 54 and extends in both a chordwise direction and in a transverse spanwise direction. The control surface 38 includes an upper skin 56 fixed to a leading edge spar 58 of the control surface. The upper skin 56 extends spanwise and chordwise from the leading edge spar across a composite torque tube 60 to the trailing edge 48 and has an outer surface 62 and an opposed inner surface 64. The control surface 38 also includes a lower skin 66 fixed to the leading edge spar 58 extending spanwise and extending chordwise from the leading edge spar across the composite torque tube 60 to the trailing edge 48 and has an outer surface 68 and an opposed inner surface 70.

The actuators 40a, 40c 42a, 42c, and 44a, 44c mounted on the inner surface 64 of the upper skin 56 at spanwise and chordwise spaced locations are selectively operable for causing, in one instance, a range of convex chordwise curvatures of the outer surface of the upper skin (as illustrated by solid lines in FIG. 5) and, in another instance, a range of concave chordwise curvatures of the outer surface of the upper skin (as illustrated by dashed lines in FIG. 5). In a similar manner, the actuators 40b, 40d 42b, 42d, and 44b, 44d mounted on the inner surface 70 of the lower skin 66 at spanwise and chordwise spaced locations are selectively operable for causing, in one instance, a range of concave chordwise curvatures of the outer surface of the upper skin (as illustrated by the dashed lines in FIG. 5) and, in another instance, a range of convex chordwise curvatures of the outer surface of the upper skin (as illustrated by the solid lines in FIG. 5).

The composite torque tube 60 provides the necessary bending and torsion stiffness to the control surface 38. Intermediate and aft spar structures 72, 74, respectively, composed of low shear rigidity resilient material, for example, of foam construction are provided to hold the upper skin 56 and lower skin 66 together and also permit relative lateral sliding motion between the upper skin and the lower skin.

The deformed shape of the control surface 38 as illustrated in FIG. 5 is achieved by means of antagonistic pull and push forces generated by the paired actuators just described. A pair of actuators, 40*a*, 40*b*, for example, that require a single input having equal and opposite electrical potentials generates the bending action. Antagonistic amplifiers provide this type of potentials to excite the paired actuators with opposite poles. Since the mass of the upper skin 56 and lower skin 66 is relatively small, it can be actuated at high frequencies. FIGS. 6 and 7 illustrate, using three-dimensional views, control surface modes resulting when selected pairs of actuators are employed. For example, when the inboard actuator pairs 40*a*, 40*b* and 40*c*, 40*d* are energized, the configuration depicted in FIG. 6 results; similarly, when the outboard actuator pairs 44*a*, 44*b* and 44*c*, 44*d* are energized, the configuration depicted in FIG. 7 results.

Figure 8:
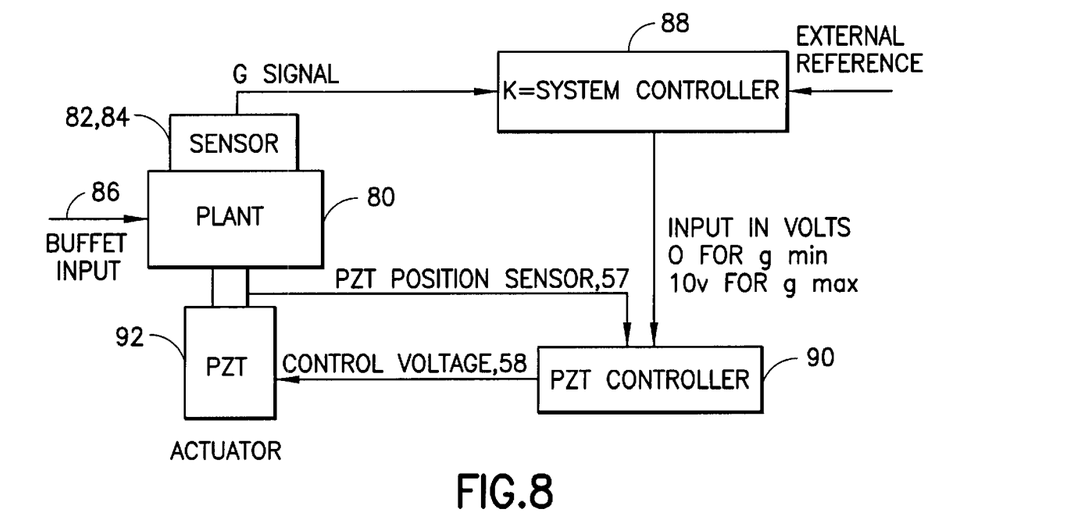
FIG. 8 is a schematic diagram presenting a typical layout of a suitable plant for performing according to the invention.

These modal deformations are called the "Active Control Surface Modes (ACSM)" and serve as the primary embodiment of the invention. When conventional control surfaces, such as ailerons, are used in an active control system, they produce only one rigid body deflection at low frequencies because they rotate about their hinge line and are relatively heavy. The rudder of a typical modern fighter aircraft, F-18, for example, weighs about 64 pounds. It is difficult to drive this massive control surface about a hinge line in excess of 30 Hertz. In contrast, the present ACSM device has the ability to deform in a complex pattern using a linear combination of individual actuator modes. This complex surface can be actuated at significantly high frequencies such that the motion encompasses the complete (wideband) spectrum of buffet loads. FIG. 8 presents a typical layout of a suitable plant 80 and inter-connections of acceleration sensors 82 and stress sensors 84 ((FIG. 2), external inputs (buffet or gust) 86, active controllers 88, actuator controllers 90 and actuators 92.

This ACSM device along with an independent computerized active control system is used to suppress flutter, buffet and gust loads with greater reliability and without interfering with the flight control systems. A brief description of the theory that interconnects all these of these disciplines will now be presented.

Let us now consider the theoretical aspect of the invention. The equations of motion in state space coordinates, X, can be written as:

$$\dot{X}=AX+B_{ext}f_{ext}+B_u u=AX+B\hat{u} \quad (1)$$

where,

X is a state space vector comprising displacements and velocities;

A is generally called a plant matrix comprising structural stiffness, inertia and unsteady aerodynamic matrices. Specifically, the matrix A defines the dynamic characteristics of the aircraft being studied;.

$B_{ext}$ is a matrix related to buffet and gust load vector, $f_{ext}$;

$B_u$ is an active control surface modal (ACSM) matrix and relates to the actuator input stimuli, u in volts. Adjoining submatrices one obtains;

$$B = \begin{bmatrix} B_{ext} \\ B_u \end{bmatrix}, \quad (1a)$$

$$\hat{u} = \begin{Bmatrix} f_{ext} \\ u \end{Bmatrix} \quad (1b)$$

The output quantities (stress and accelerations) are defined by $$Y = \begin{Bmatrix} \sigma \\ g \end{Bmatrix} = \begin{bmatrix} C_1 & D_{11} & D_{12} \\ C_2 & D_{21} & D_{22} \end{bmatrix} \begin{Bmatrix} X \\ f_{ext} \\ u \end{Bmatrix} \quad (2)$$

where:

σ=stress vector;

g=acceleration vector;

$f_{ext}$=Input buffet or gust load vector, either in frequency or time domain;

u=actuator input stimuli in volts or amps depending on the type of actuators used;

$$\underline{C} = \begin{bmatrix} C_1 \\ C_2 \end{bmatrix} = \text{an output matrix related to the aircraft state vector,}$$

X as defined by equation (2);

$$\underline{D} = \begin{bmatrix} D_{11} & D_{12} \\ D_{21} & D_{22} \end{bmatrix} = \text{an output matrix related buffet load and the actuator stimuli as defined by equation (2);}$$

A standard analysis tool will be used to compute the control gain matrix K such that the actuator stimuli is related to the sensor output, $$Y = \begin{Bmatrix} \sigma \\ g \end{Bmatrix},$$

stress σ and acceleration g:

$$u = K \begin{Bmatrix} \sigma \\ g \end{Bmatrix} \quad (3)$$

Figure 9:
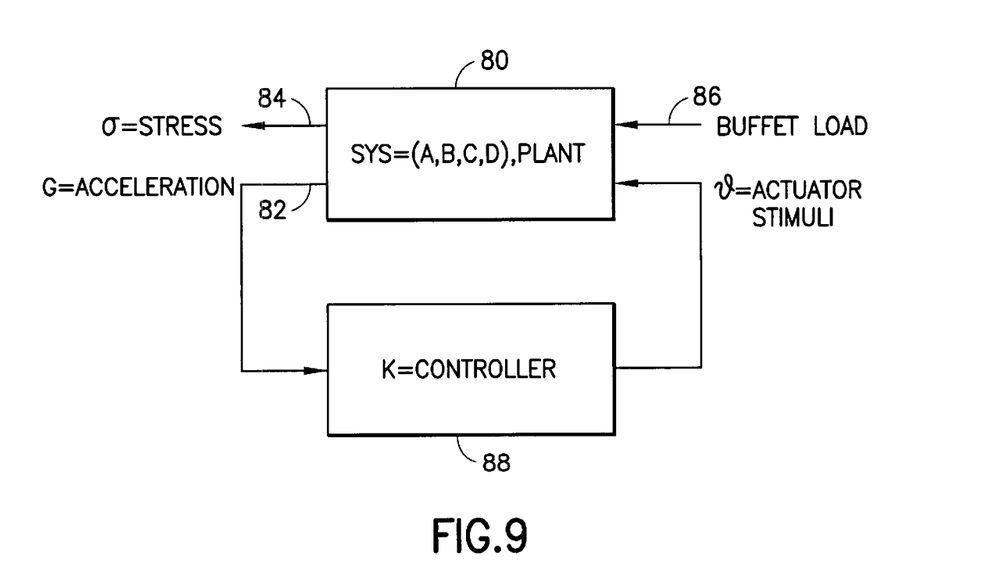
FIG. 9 is a schematic diagram presenting a general layout of the active control algorithm that connects an external buffet load to a stress output according to the invention.

In some instances, only accelerations are used as the sensor signals. Eliminating u in equations (1) and (2), a closed loop system relating the stress output to the external buffet or gust input is given by:

$$\sigma(\omega)=H(\omega)f_{ext}(\omega) \quad (4)$$

in which H is a matrix of frequency response of the dynamic system. The corresponding stress power spectral density can be computed from equation (4). FIG. 9 depicts the general layout of the active control algorithm that connects the external buffet load to the stress output as defined by equation (4). Computer software of the active control algorithm can be written and implemented into the aircraft. Thus, a single device can be used to reduce buffet and gust loads and also to eliminate flutter, a self excited stability phenomena. A typical example is presented to demonstrate the proof of concept.

Proof of Concept

Figure 10:
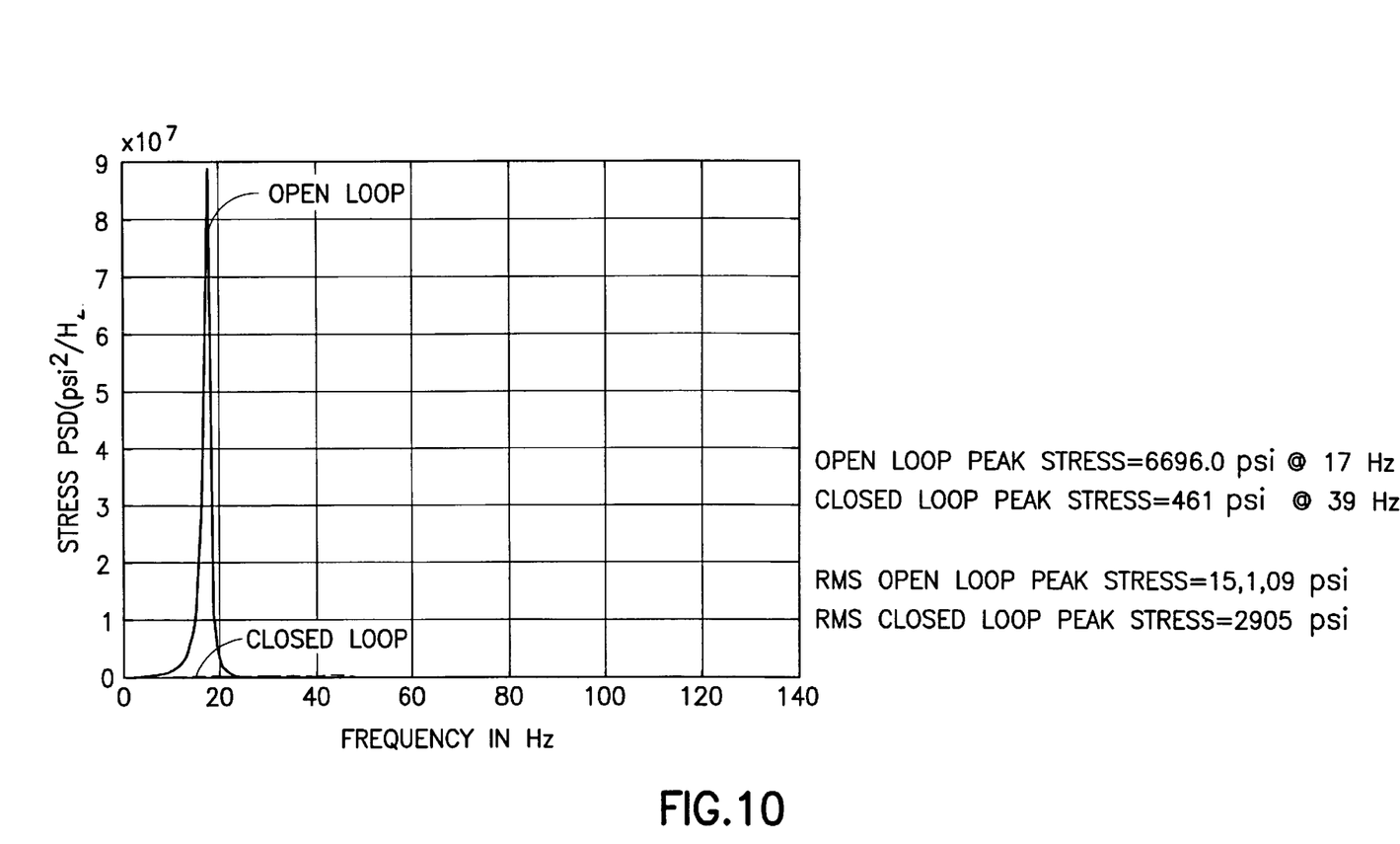
FIG. 10 is a graph which, in accordance with the invention, compares the wing root stress (in PSD, power spectral density) computed for open and closed loop cases as a function of frequency in Hertz and showing significant stress reductions in the latter instance.

To demonstrate the merits of the active control surface modal device, a buffet response analysis was conducted using wind tunnel measured buffet pressure data. This data corresponds to a twin-tail of a military aircraft (for example, an F-18) at a 34-degree angle-of-attack flight condition. Data points 1 to 15 are shown in FIG. 2. Frequency response analyses were performed for the open loop (without using the ACSM device) and the closed loop (using the ACSM device) cases. In the closed loop case, two acceleration signals measured at the wing tip were used as feedback signals to command the actuators so as to minimize accelerations 1 and stresses. FIG. 10 compares the PSD (power spectral density) plot of the wing root stress computed for open and closed loop cases in linear scale. Since, the PSD data are defined as square of the stress per Hertz, the open loop data are much larger than the closed loop system. Therefore, the stress PSD curve for the closed loop case is hardly seen in FIG. 10.

Figure 11:
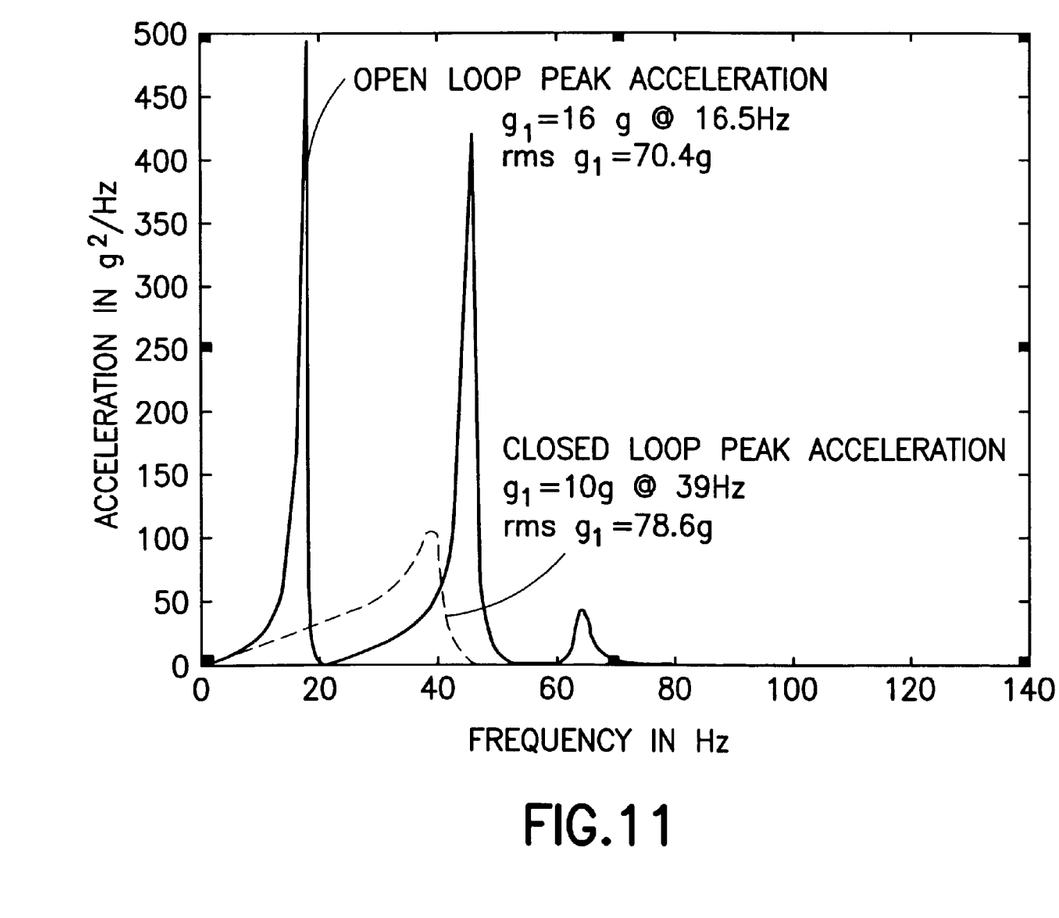
FIG. 11 is a graph which, in accordance with the invention, and similarly to FIG. 10 shows similar reductions in accelerations in the closed loop case.
Figure 12:
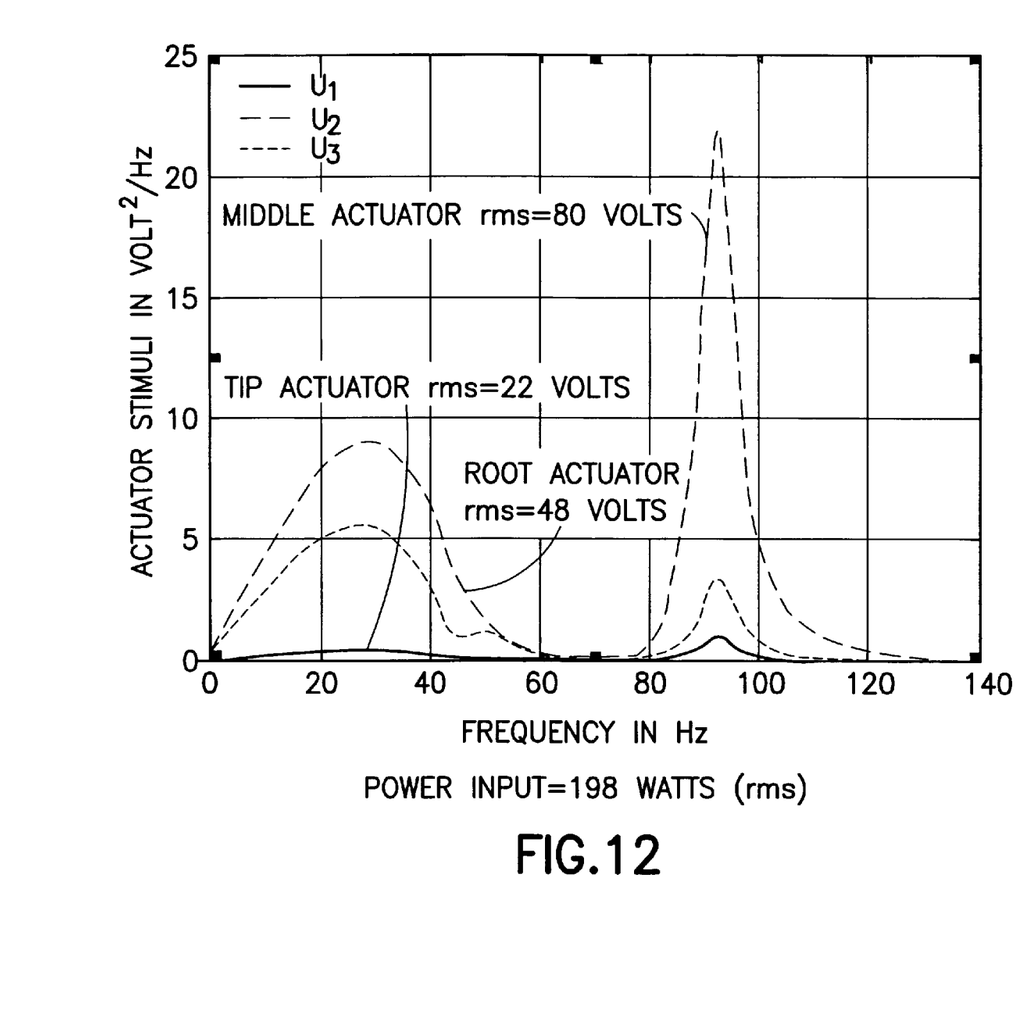
FIG. 12 is a graph which, in accordance with the invention, shows the electrical voltage input to the typical piezoelectric actuators used in the analysis proving the concept of the invention.

The peak and rms (root mean square) values of the output (that is, stress and acceleration) were computed using several hundred data sampling intervals. The peak stress in this analysis reduces from 6,691 psi (pounds per square inch) to 461 psi, while the rms stress reduces from 15,109 psi to 2,109 psi. Thus, the proposed ACSM device shows an 86% reduction in the rms stress. Likewise, FIG. 11 shows similar reductions in accelerations. FIG. 12 shows the electrical voltage input to typical piezoelectric actuators, u1, u2 and u3 used in this analysis. Peak to peak voltage is less than 160 V and the rms power is about 198 watts, which is less than a 200 watt light bulb.

In general, the fatigue life of a metallic structure increases by one lifetime for every 10% reduction in the rms stress. Accordingly, this example shows eight-fold increase in the fatigue life. Thus, the active control surface modal device is proved to be very effective in reducing the dynamic effects. Similar, trends have been observed in the case of gust environment (not shown). Likewise, flutter suppression can also be achieved with great success.

From all of the foregoing, consider some of the advantages of the proposed active control surface modal device over the known flutter suppression and load alleviation methods:

1. the innovations disclosed are expected to provide overwhelming aerodynamic damping in a wideband frequency spectrum so that buffet, gust and flutter associated dynamic problems can be attended to by means a single device;
2. an independent active control algorithm is provided so that there is no interference with the flight control system, which pilots find to be particularly desirable;
3. a control surface modified according to the invention preserves all the entities of a conventional control, since it is able to rotate about the conventional hinge line;
4. the proposed system can be retrofitted to existing aircraft very economically, and still more economically implemented in new aircraft;

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A control surface having a leading edge and a trailing edge and a spanwise extending spar rotatably hinged at its leading edge on an aerodynamic lifting surface comprising:

an upper skin fixed to the spar of the control surface extending spanwise and extending chordwise from the leading edge of the control surface to the trailing edge of the control surface and having an outer surface and an opposed inner surface;

a lower skin fixed to the spar extending spanwise and extending chordwise from the leading edge of the control surface to the trailing edge of the control surface and having an outer surface and an opposed inner surface;

a plurality of first actuators mounted on the inner surface of the upper skin at spanwise spaced locations selectively operable for causing, in one instance, a range of convex chordwise curvatures of the outer surface of the upper skin and, in another instance, a range of concave chordwise curvatures of the outer surface of the upper skin;

a plurality of second actuators mounted on the inner surface of the lower skin and juxtaposed at spanwise spaced locations selectively operable, antagonistic to the first actuators, for causing, in one instance, a range of concave chordwise curvatures of the outer surface of the lower skin and, in another instance, a range of convex chordwise curvatures of the outer surface of the lower skin; and an active modal control system including a controller for operating the plurality of the first and second actuators and thereby adjusting the outer contour of the control surface and thereby suppressing flutter, buffet, and gust loads to which the aerodynamic lifting surface is subjected.

2. A control surface as set forth in claim 1 wherein each of the first actuators has spaced apart first and second ends attached, respectively, to the inner surface of the upper skin at chord-wise spaced first and second locations; and wherein each of the second actuators has spaced apart first and second ends attached, respectively, to the inner surface of the lower skin at chord-wise spaced first and second locations;

whereby, in one instance, operation of the first actuators to reduce the distance between the first and second ends thereof imparts a convex curvature to the upper surface of the upper skin and, simultaneously, operation of the second actuators to increase the distance between the first and second ends thereof together imparts a concave curvature to the lower surface of the upper skin; and whereby, in another instance, operation of the first actuators to increase the distance between the first and second ends thereof imparts a concave curvature to the upper surface of the upper skin and, simultaneously, operation of the second actuators to decrease the distance between the first and second ends thereof together imparts a convex curvature to the lower surface of the upper skin.

3. A control surface as set forth in claim 2 wherein the control surface includes a forward pair of the first and second actuators adjacent to and aft of the leading edge and an aft pair of the first and second actuators adjacent to and forward of the trailing edge.

4. A control surface as set forth in claim 3 including:

a trailing edge spar of resilient material extending spanwise joining together the upper skin and the lower skin along the trailing edge of the control surface; and an intermediate spar of resilient material extending spanwise joining together the upper skin and the lower skin intermediate the leading edge and the trailing edge of the control surface.

5. A control surface as set forth in claim 4 wherein the resilient material is a low shear structural material of foam composition.

6. A control surface as set forth in claim 1 including:
a spanwise extending torque tube attached at a forward end to the spanwise extending spar, the inner surfaces of the upper skin and of the lower skin being fixed to the torque tube.

7. A control surface as set forth in claim 1 including:
a plurality of sensors on the aerodynamic lifting surface for detecting dynamic load conditions, selectively, buffet loads and gust loads and flutter imparted to the aerodynamic lifting surface during flight and for generating signals representative of the detected dynamic load conditions; and
a controller responsive to the signals generated by the sensors for operating the plurality of first and second actuators to adjust the contour of the aerodynamic lifting surface and thereby alleviate the deleterious effects imparted to the aerodynamic lifting surface by any combination of the buffet loads and gust loads and flutter.

8. An active modal system for suppressing flutter, buffet, and gust loads imparted to an aerodynamic lifting surface comprising:
a control surface having a leading edge and a trailing edge and rotatably hinged at its leading edge on a spanwise extending spar of the aerodynamic lifting surface including an upper surface and a lower surface and extending in both a chordwise direction and in a transverse spanwise direction;
an upper skin fixed to the spar extending spanwise and extending chordwise from the leading edge of the control surface to the trailing edge of the control surface and having an outer surface and an opposed inner surface;
a lower skin fixed to the spar extending spanwise and extending chordwise from the leading edge of the control surface to the trailing edge of the control surface and having an outer surface and an opposed inner surface;
a plurality of first actuators mounted on the inner surface of the upper skin at spanwise spaced locations selectively operable for causing, in one instance, a range of convex chordwise curvatures of the outer surface of the upper skin and, in another instance, a range of concave chordwise curvatures of the outer surface of the upper skin;
a plurality of second actuators mounted on the inner surface of the lower skin and juxtaposed at spanwise spaced locations selectively operable, antagonistic to the first actuators, for causing, in one instance, a range of concave chordwise curvatures of the outer surface of the lower skin and, in another instance, a range of convex chordwise curvatures of the outer surface of the lower skin; and
a controller for operating the plurality of the first and second actuators for adjusting the contour of the outer surface and thereby suppressing the flutter, buffet, and gust loads to which the aerodynamic lifting surface is subjected.

9. A system as set forth in claim 8 wherein each of the first actuators has spaced apart first and second ends attached, respectively, to the inner surface of the upper skin at chord-wise spaced first and second locations; and
wherein each of the second actuators has spaced apart first and second ends attached, respectively, to the inner surface of the lower skin at chord-wise spaced first and second locations;
whereby, in one instance, operation of the first actuators to reduce the distance between the first and second ends thereof imparts a convex curvature to the upper surface of the upper skin and, simultaneously, operation of the second actuators to increase the distance between the first and second ends thereof together imparts a concave curvature to the lower surface of the upper skin; and
whereby, in another instance, operation of the first actuators to increase the distance between the first and second ends thereof imparts a concave curvature to the upper surface of the upper skin and, simultaneously, operation of the second actuators to decrease the distance between the first and second ends thereof together imparts a convex curvature to the lower surface of the upper skin.

10. A system as set forth in claim 9 wherein the control surface includes a forward pair of the first and second actuators adjacent to and aft of the leading edge and an aft pair of the first and second actuators adjacent to and forward of the trailing edge.

11. A system as set forth in claim 10 including:
a trailing edge spar of resilient material extending spanwise joining together the upper skin and the lower skin along the trailing edge of the control surface; and
an intermediate spar of resilient material extending spanwise joining together the upper skin and the lower skin intermediate the leading edge and the trailing edge of the control surface.

12. A system as set forth in claim 11 wherein the resilient material is a low shear structural material of foam composition.

13. A system as set forth in claim 8 including:
a plurality of chordwise extending torque tubes at spanwise spaced locations, each attached at a forward end to the spanwise extending spar, the upper skin being fixed to the plurality of torque tubes.

14. A system as set forth in claim 8 including:
a sensor for detecting dynamic load conditions, selectively, buffet loads and gust loads and flutter imparted to the aerodynamic lifting surface during flight and for generating signals representative of the detected dynamic load conditions; and
a controller responsive to the signals generated by the sensor for operating the plurality of first and second actuators to adjust the contour of the aerodynamic lifting surface and thereby alleviate the deleterious effects imparted to the aerodynamic lifting surface by any combination of the buffet loads and gust loads and flutter.

15. A method of suppressing flutter, buffet, and gust loads imparted to an aerodynamic lifting surface including an upper surface and a lower surface comprising the steps of:
(a) providing a control surface having a leading edge and a trailing edge and rotatably hinged at its leading edge including an upper skin fixed to a spar extending spanwise and extending chordwise from the leading edge to the trailing edge and having an outer surface and an inner surface opposed to the outer surface and including a lower skin fixed to the spar and extending chordwise from the leading edge to the trailing edge and an inner surface opposed to the outer surface;

(b) detecting dynamic load conditions, selectively, at least one of buffet loads and gust loads and flutter and the characteristics thereof imparted to the aerodynamic lifting surface during flight and generating signals representative of the detected dynamic load conditions; and (c) in response to the generated signals representative of the detected dynamic load conditions of buffet loads and gust loads and flutter imparted to the aerodynamic lifting surface during flight as detected in step (a), operating a plurality of first and second actuators to adjust the contour of the aerodynamic lifting surface and thereby alleviate the deleterious effects imparted to the aerodynamic lifting surface by any combination of the buffet loads and gust loads and flutter.

16. A method as set forth in claim 15 wherein step (b) includes the steps of:

(c) causing, in one instance, a range of convex chordwise curvatures of the outer surface of the upper skin of the control surface and, simultaneously, a range of concave chordwise curvatures of the outer surface of the lower skin; and (d) causing, in another instance, a range of concave chordwise curvatures of the outer surface of the upper skin of the control surface and, simultaneously, a range of convex chordwise curvatures of the outer surface of the lower skin.

17. A method as set forth in claim 15 wherein step (b) includes the steps of:

(f) attaching a plurality of the first actuators on the inner surface of the upper skin at spanwise spaced locations;

(g) attaching a plurality of second actuators on the inner surface of the lower skin and juxtaposed at spanwise spaced locations the second actuators being selectively operable, antagonistic to the first actuators;

(h) in one instance, selectively operating the first actuators for causing, a range of convex chordwise curvatures of the outer surface of the upper skin and selectively operating the plurality of second actuators for causing a range of concave chordwise curvatures of the outer surface of the lower skin; and (i) in another instance, selectively operating the first actuators for causing a range of concave chordwise curvatures of the outer surface of the upper skin and selectively operating the plurality of second actuators for causing a range of convex chordwise curvatures of the outer surface of the lower skin.

* * * * *